United States Patent
Patel et al.

(10) Patent No.: US 11,052,733 B2
(45) Date of Patent: Jul. 6, 2021

(54) CONVERTIBLE SKELETON DOOR

(71) Applicant: Ford Global Technologies, LLC, Dearborn, MI (US)

(72) Inventors: Ranil Patel, Southfield, MI (US); Timothy Bearup, South Lyon, MI (US); Stephen Thomas Kozak, Northville, MI (US); Colleen Hoffman, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 89 days.

(21) Appl. No.: 15/882,882

(22) Filed: Jan. 29, 2018

(65) Prior Publication Data
US 2019/0232766 A1    Aug. 1, 2019

(51) Int. Cl.
*B60J 5/04* (2006.01)

(52) U.S. Cl.
CPC ........... *B60J 5/0437* (2013.01); *B60J 5/0419* (2013.01); *B60J 5/0425* (2013.01); *B60J 5/0447* (2013.01); *B60J 5/0463* (2013.01)

(58) Field of Classification Search
CPC ...... B60J 5/0437; B60J 5/0486; B60J 5/0487; B60J 5/048
See application file for complete search history.

(56) References Cited

U.S. PATENT DOCUMENTS

| | | | | |
|---|---|---|---|---|
| 3,782,036 A | * | 1/1974 | Clark | B60J 5/0412 49/502 |
| 4,328,642 A | * | 5/1982 | Presto | B60J 5/0406 49/502 |
| 4,606,148 A | * | 8/1986 | Gandini | B60J 5/0406 49/502 |
| 4,743,062 A | | 5/1988 | McLaren et al. | |
| 5,417,470 A | * | 5/1995 | Holt | B60J 5/0416 296/146.6 |
| 6,101,765 A | | 8/2000 | Hashimoto et al. | |
| 6,343,832 B1 | | 2/2002 | Queener et al. | |
| 2005/0110298 A1 | * | 5/2005 | Fin | B60J 5/0487 296/146.5 |
| 2018/0297455 A1 | * | 10/2018 | Hale | B60J 5/0476 |
| 2019/0061490 A1 | * | 2/2019 | Getzschman | B60J 5/0487 |

FOREIGN PATENT DOCUMENTS

| | | |
|---|---|---|
| DE | 102005011808 A1 | 9/2006 |
| EP | 0145306 B1 | 8/1989 |
| EP | 0291107 B1 | 8/1990 |

* cited by examiner

*Primary Examiner* — Gregory J Strimbu
(74) *Attorney, Agent, or Firm* — David Coppiellie; Carlson, Gaskey & Olds, P.C.

(57) ABSTRACT

A vehicle door assembly includes a door housing configured for covering a vehicle access opening. A frame member is disposed within the door housing. A module includes an intrusion beam coupled to the frame member and removable from the door housing. The module is configured to accept attachment of a module hinge and a module latch to provide a secondary door assembly. A modular vehicle door assembly and a method of assembling a door assembly to a vehicle are also disclosed.

12 Claims, 6 Drawing Sheets

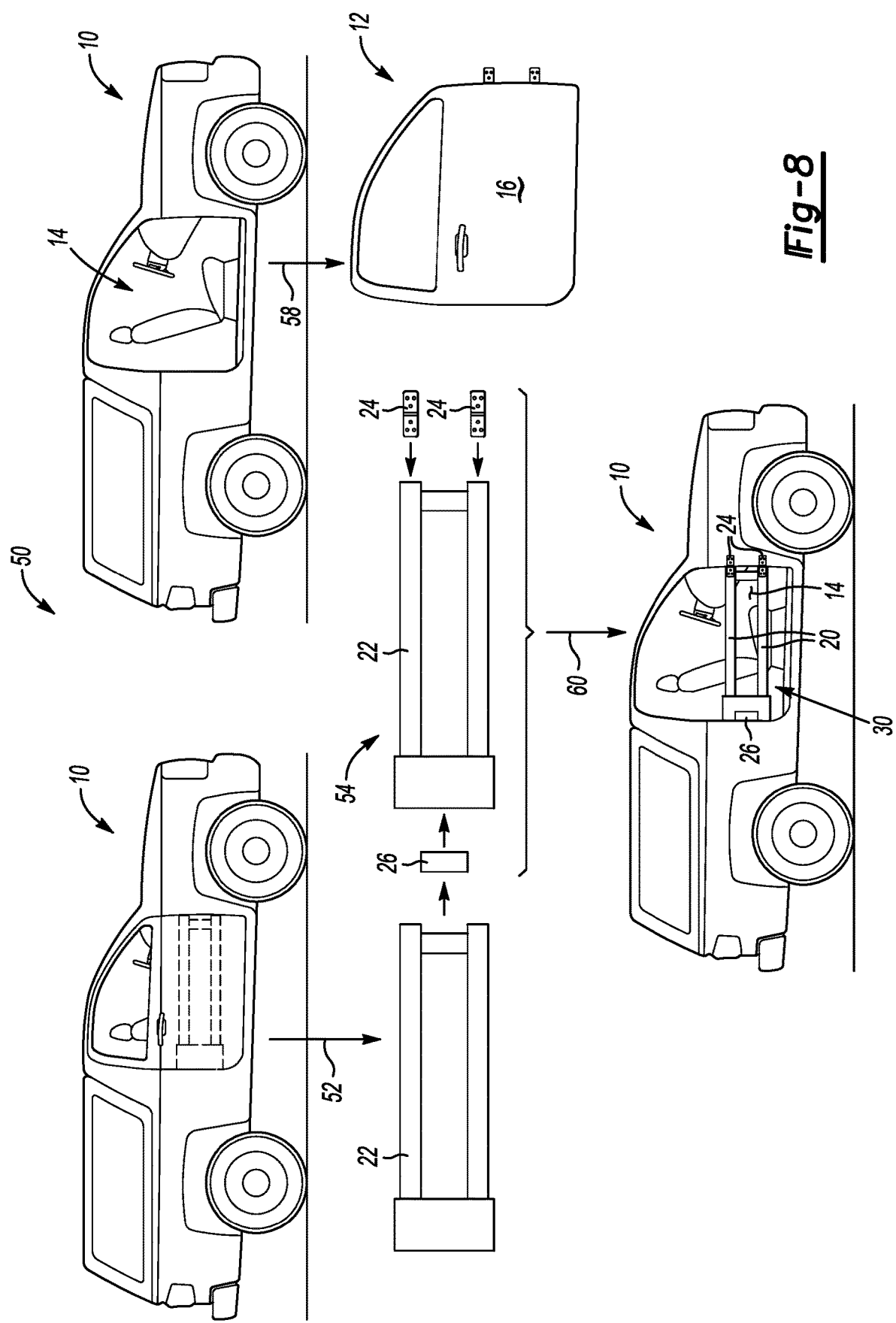

CONVERTIBLE SKELETON DOOR

TECHNICAL FIELD

This disclosure relates to a door for a motor vehicle that includes features for converting from a conventional door to a skeleton door that provides an open air experience.

BACKGROUND

A conventional vehicle door includes a full outer skin along with window and latch hardware to completely close off a vehicle cabin from the environment. Some vehicles include tubular doors without an outer skin or other hardware to provide an open air experience. The tubular doors allow occupants to experience the outside environment from within the cabin and may provide better visibility for off road operation. The tubular doors provide a reduced structure to provide some protection while still providing the desired open air experience. The tubular open air doors are provided as separate optional doors that require removal and storage of the conventional door. When not in use the tubular open air doors are not typically stored within the vehicle. Storage separate from the vehicle can result in loss or damage.

SUMMARY

A vehicle door assembly according to an exemplary aspect of the present disclosure includes, among other things, a door housing configured for covering a vehicle access opening. A frame member is disposed within the door housing. A module includes an intrusion beam coupled to the frame member and removable from the door housing. The module is configured to accept attachment of a module hinge and a module latch to provide a secondary door assembly.

In a further non-limiting embodiment of the foregoing vehicle door assembly, the module includes a first bracket on one end of the intrusion beam and a second bracket on a second end of the intrusion beam.

In a further non-limiting embodiment of any of the foregoing vehicle door assemblies, the intrusion beam includes all the intrusion beams within the door housing.

In a further non-limiting embodiment of any of the foregoing vehicle door assemblies, the intrusion beams include tubular structures.

In a further non-limiting embodiment of any of the foregoing vehicle door assemblies, the frame member includes a channel and the first bracket and the module includes a tab that slides within the channel to secure the module within the door housing.

In a further non-limiting embodiment of any of the foregoing vehicle door assemblies, a door glass assembly is supported within the door housing and the module is spaced apart from the door glass assembly and slidable along the frame member during removal from the door housing.

In a further non-limiting embodiment of any of the foregoing vehicle door assemblies, the second bracket is securable to the door housing with removable fasteners.

In a further non-limiting embodiment of any of the foregoing vehicle door assemblies, the door housing is removable from the vehicle and the module including a module hinge assembly and a module latch assembly are attachable to the vehicle within the access opening.

A modular vehicle door assembly according to an exemplary aspect of the present disclosure includes, among other things, a door housing. A frame member is disposed within the door housing. A module is supported on the frame member and removable from the door housing. A module hinge assembly is attachable to the module once the module is removed from the door housing. A module latch assembly is attachable to the module once removed from the door housing.

In a further non-limiting embodiment of the foregoing modular vehicle door assembly, the module includes intrusion beams extending between a first bracket and a second bracket. At least one of the first bracket and the second bracket are securable to the frame member within the door housing.

In a further non-limiting embodiment of any of the foregoing modular vehicle door assemblies, the intrusion beams include tubular structures.

In a further non-limiting embodiment of any of the foregoing modular vehicle door assemblies, at least one of the frame member and the first and second brackets include a channel and the other of the frame member and the at least one of the first and second brackets include a tab that slides within the channel to secure the module within the door housing.

In a further non-limiting embodiment of any of the foregoing modular vehicle door assemblies, a door glass assembly is supported within the door housing and the module is received on the frame member and is spaced apart from the door glass assembly during removal from door housing.

A method according to another exemplary aspect of the present disclosure includes, among other things, a module is assembled including the vehicle door intrusion beams such that the module maybe removed from the vehicle door. A module hinge assembly is configured for attachment to the module. A module latch assembly is configured for attachment to the module. The vehicle door is assembled such that it may be removed from a vehicle. The module is configured such that it may be secured by the module hinge assembly to the vehicle in place of the vehicle door.

In a further non-limiting embodiment of the foregoing method, the module is configured for removal by securing the module within the vehicle door with removable fasteners.

In a further non-limiting embodiment of any of the foregoing methods, the module is assembled to include one of a tab and channel for securement to a frame member within the vehicle door that includes the other of the tab and channel such that the module may slide relative to the frame member for removal from the vehicle door.

In a further non-limiting embodiment of any of the foregoing methods, the module is assembled to include a second bracket that receives a portion of the removable fasteners such that the removable fasteners are accessible from an end of the vehicle door and the module is removable by grasping the second bracket and sliding the module out from the vehicle door.

In a further non-limiting embodiment of any of the foregoing methods, the module is configured for securing the hinge assembly to a first bracket and the latch assembly to the second bracket.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 8 is a schematic view of a method of removing, assembling and installing a skeleton door.

DETAILED DESCRIPTION

Figure 1:
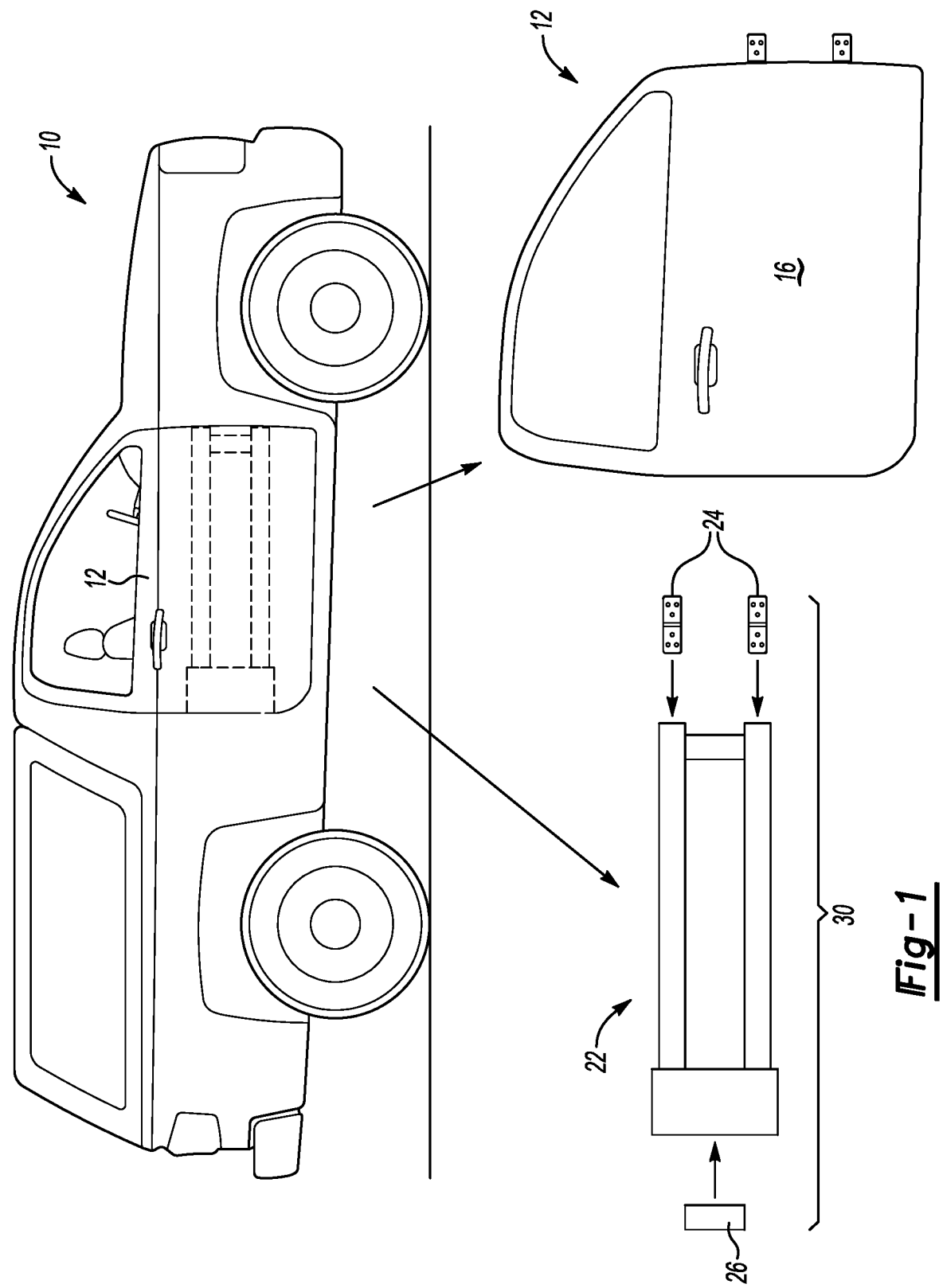
FIG. 1 is a schematic view of a vehicle including an example convertible door.

Referring to FIG. 1, a vehicle 10 includes a door 12 that is disposed within an access opening 14. The example door 12 includes an internal module 22 that is removable to provide a skeleton door assembly schematically indicated at 30. The example door 12 includes a housing 16 that is attached to the vehicle 10 by way of hinges 18. Within the housing 16 is the module 22. The module 22 is removable from the housing 16 for use as the skeleton door for the vehicle 10. The module 22 is assembled to a module latch 26 and module hinges 24 that are stored separately from the module 22 and the door housing 16. The module latch 26 and hinges 24 are of a size that they may be easily and conveniently stored within the vehicle 10.

Figure 2:
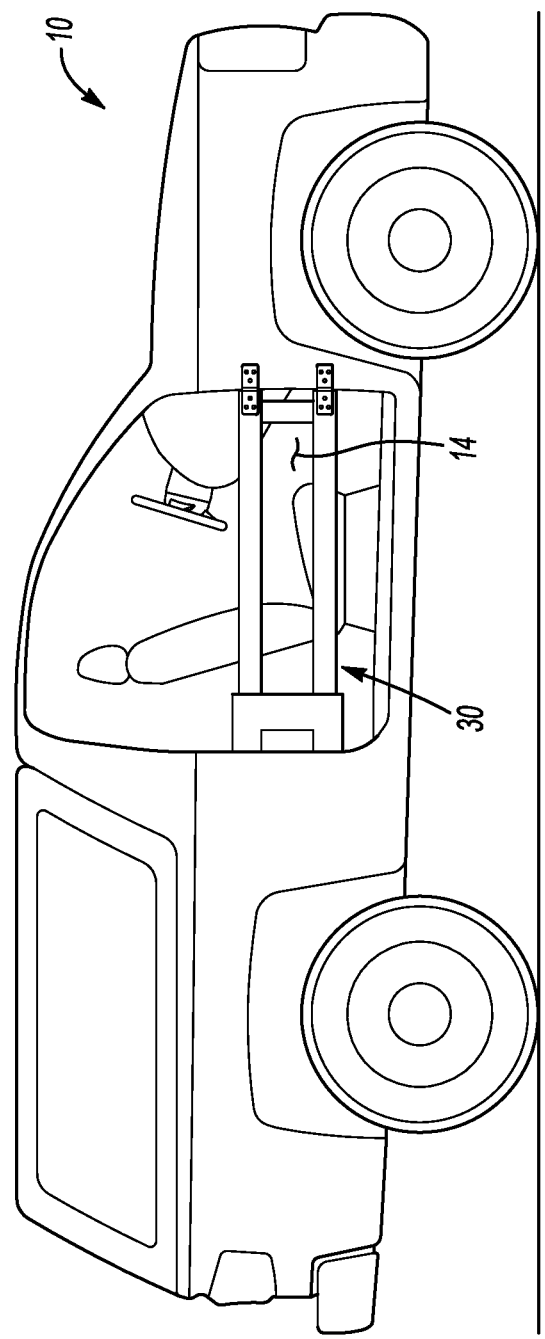
FIG. 2 is a schematic view of the vehicle including with an example skeleton door installed.

Referring to FIG. 2 with continued reference to FIG. 1, the example skeleton door assembly 30 is shown assembled to the vehicle 10. When the skeleton door assembly 30 is assembled to the vehicle 10 there is an open feeling to the vehicle cabin while still providing some protection. Moreover, the door 12 is removed from the vehicle 10 and stored to prevent damage. The reduced obstruction provided by the skeleton door assembly 30 improves visibility and the ability to experience an open air driving experience.

Figure 3:
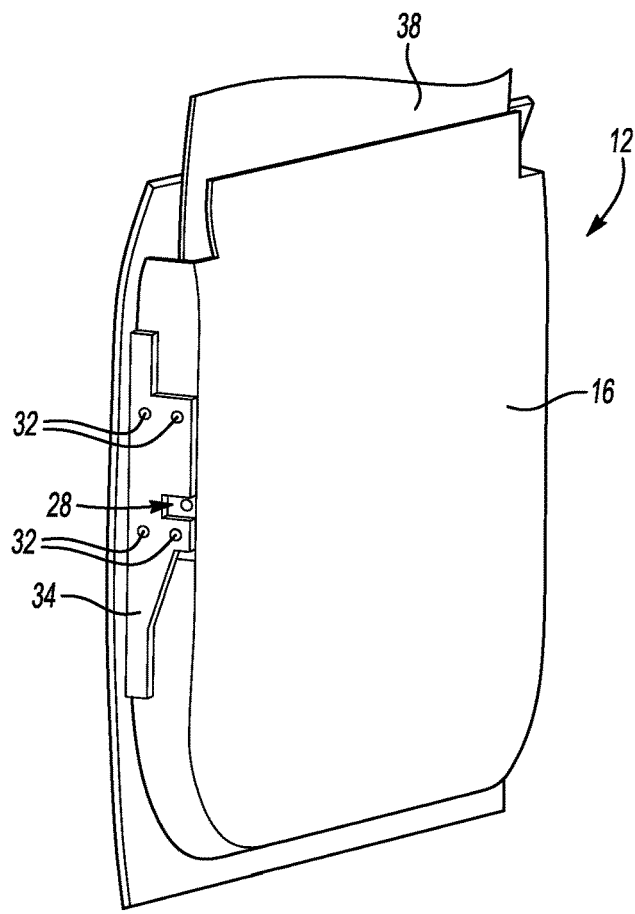
FIG. 3 is a perspective side view of a vehicle of an example convertible door embodiment.
Figure 4:
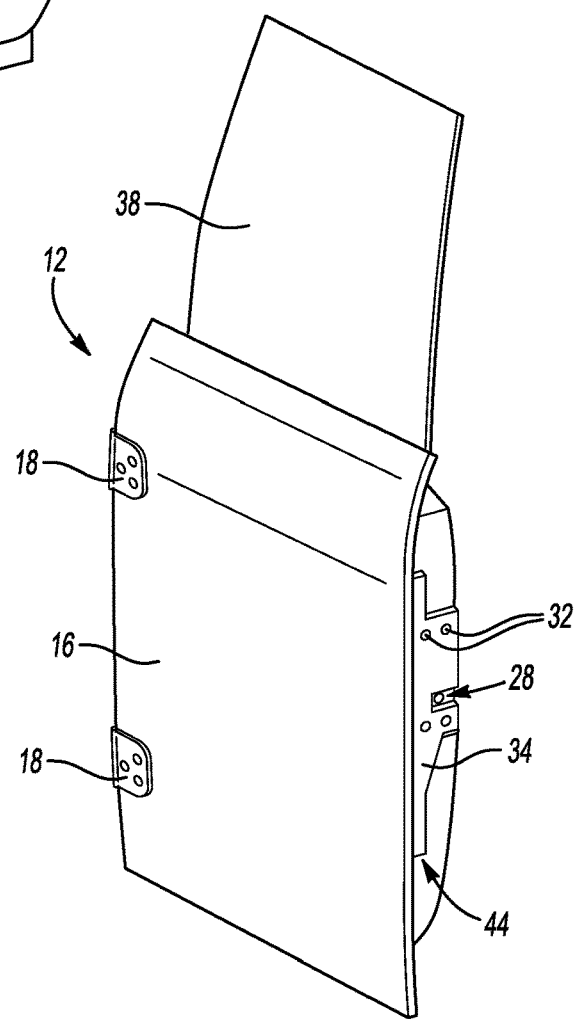
FIG. 4 is another perspective side view the example convertible door embodiment.

Referring to FIGS. 3 and 4, the example door 12 includes the hinges 18 and the door housing 16. The module 22 includes a second bracket 34 that is attached to a side 44 of the door housing 16. The second bracket 34 is attached by way of fasteners 32 to the door housing 16 and is an integral portion of the door 12 as it is being utilized for normal operation and attached to the vehicle 10. The door housing 16 includes a window 38 and accompanying structures that enable opening and closing of the window. Moreover, the door housing 16 houses a latch 28 provided to secure the door 16 to the vehicle 10 in a closed position.

Figure 5:
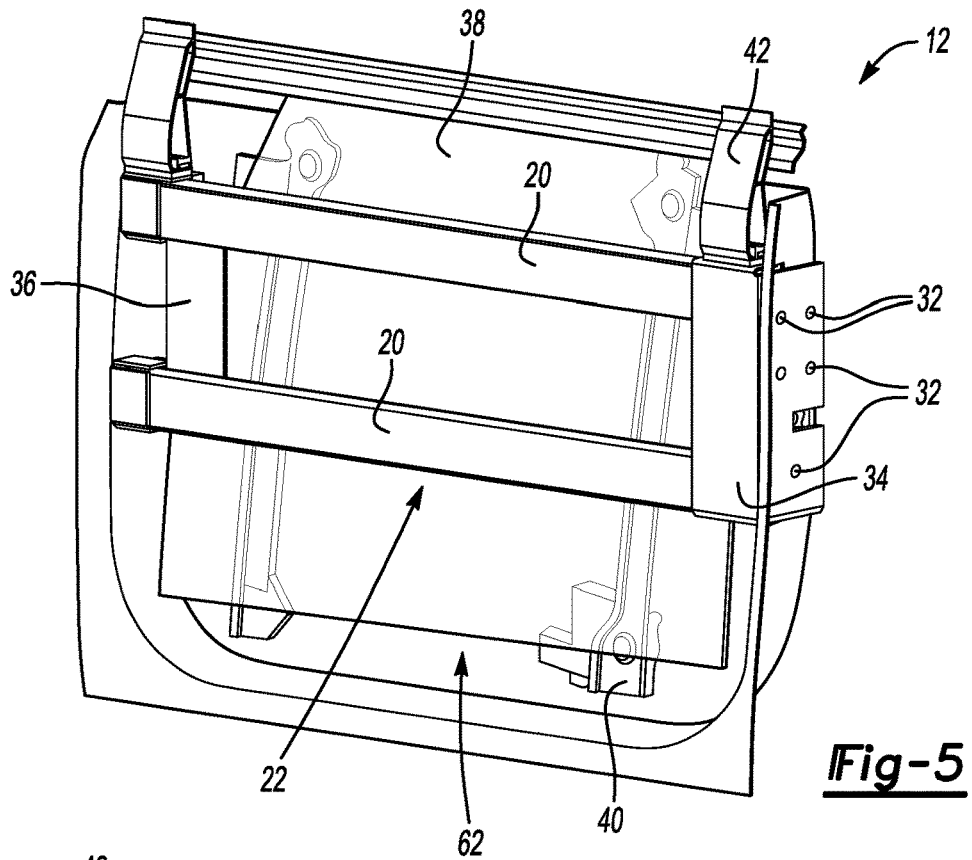
FIG. 5 is a perspective view of internal structure of the example convertible door embodiment.

Referring to FIG. 5 with continued reference to FIGS. 3 and 4, an interior of the door 12 is shown and includes intrusion beams 20 that extend horizontally the width of the door housing 16. The intrusion beams 20 are a part of the module 22 and provide the structure for collision protection of the door 12. The intrusion beams 22 extend between a first bracket 36 and the second bracket 34. The intrusion beams 20 are removable with the module 22 for use as part of the skeleton door assembly 30. Incorporation of the intrusion beams 20 with the module 22 reduces the number of component parts and weight of the door structure.

The module 22 is supported within the door housing 16 at least partially by a frame member 42. The disclosed frame member 42 is disposed at a top part of the door housing 16. The example frame member 42 is part of an outer reinforcement structure of the door housing 16. The example frame member 42 is formed as an extrusion to provide a uniform cross-section along its length. In this example the frame member 42 is provided in 2 separate parts that are spaced apart from each other across the door width.

Figure 6:
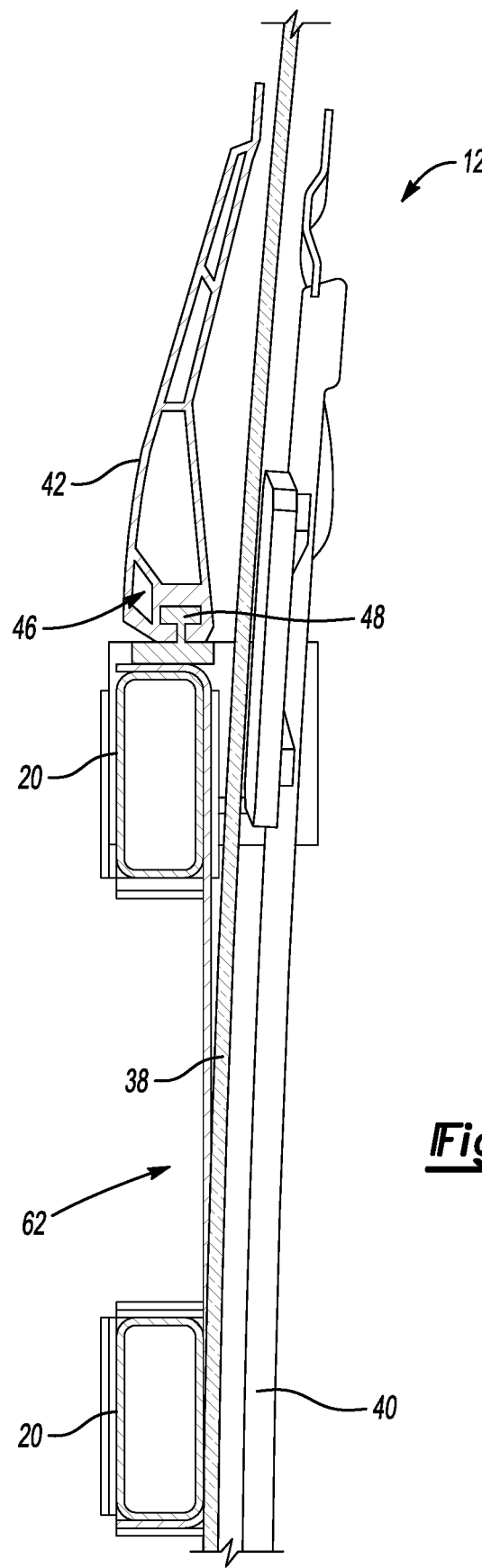
FIG. 6 is a cross-section of the example vehicle door.

Referring to FIG. 6 with continued reference to FIG. 5, the module 22 is slidable out of the door housing 16 such that it will not interfere and hit or slide against the window 38 or other hardware such as a window regulator that is partially shown schematically at 40 disposed within the door housing 16. To remove the module 22, the fasteners 32 are removed from the second bracket 34 disposed on the side 44 of the door housing 16. The module 22 is then free to be removed from the interior portion of the door housing 16.

Figure 7:
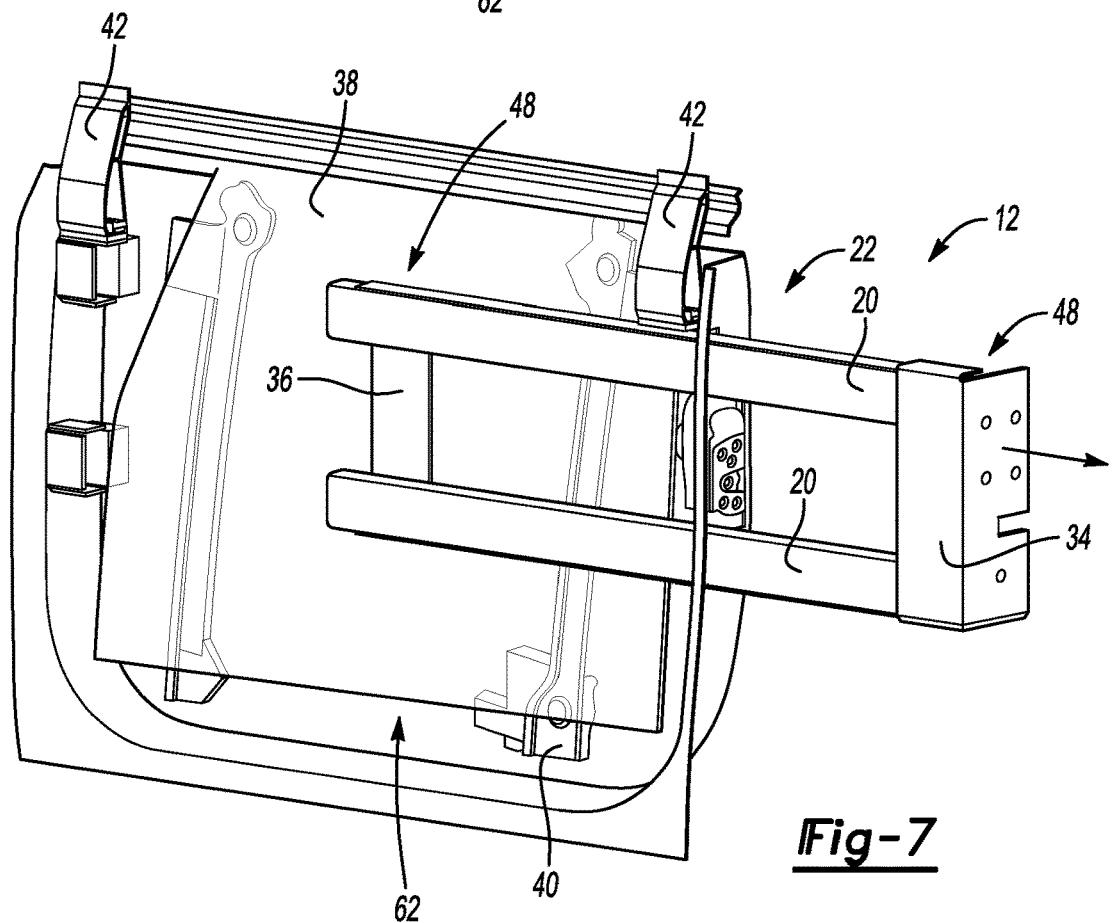
FIG. 7 is an internal view of the vehicle door with the module partially removed.

Referring to FIG. 7 with continued reference to FIG. 6, sliding removal of the module 22 occurs by grasping the second bracket 34 and pulling it away from the side 44 of the door housing 16. The first bracket 36 is engaged to the frame member 42. The example frame member 42 includes two separate parts separated across the width of the door housing 16.

The example frame members 42 each include a channel 46. The channel 46 is configured to receive a tab 48 that extends from the first bracket 36 along the intrusion beam 20 to the second bracket 34. The tab 48 is received within the channel 46 and maintains an orientation of the module 22 including the intrusion beams 20 as it is removed from the door housing 16.

Reinstallation of the door module 22 is conducted by inserting the tab 48 into the channel 46 of the frame member 42 and then sliding the module 22 back into the door housing 16. Moreover, although the channel 46 and tab 48 may be reversed such that the tab 48 is on the frame members 42 and the channel is provided on the top intrusion beam 20 of the module 22. Additionally, other structures of the module 22 could include a feature matting to the features of door housing 16. Furthermore, although a channel and tab are illustrated, other mating structures and shapes that provide relative alignment between relative sliding parts could also be utilized within the contemplation of this disclosure.

Referring to FIG. 8 with continued reference to FIGS. 6 and 7, a method of converting the door 12 for the vehicle 10 to a skeleton door assembly 30 is schematically shown at 50 and includes the initial step 52 of removing the module 22 from the door 12. Once the module 22 is removed from the door 12, assembly steps are undertaken to install a hinge 24 and latch 26. The hinges 24 and latches 26 can be stored within the vehicle 10 and are separately assembled to the module 22 once it is removed from the door. Attachment of the latch 26 is schematically indicated at 54 and is provided by use of threaded fasteners or other mechanical connection techniques that are known. Moreover, assembly of the hinges 24 as indicated at 56 is also provided by way of threaded fasteners or other mechanical linkage configurations and systems as are known.

The door 12 is removed from the vehicle 10 as is indicated at 58 and stored in a safe location to prevent damage. It should be appreciated that the door 12 may be removed at any time once the module 22 is removed from the door housing 16. Moreover, it is also possible to remove the module 22 from the door 12 once the door 12 is removed from the vehicle.

With the door 12 removed, the vehicle 10 includes an axis opening 14 into which the skeleton door assembly 30 is assembled as is schematically shown at 60. Assembly of the skeleton door assembly 30 includes attachment of the hinges 56 to the vehicle 10 and alignment of the latch 26 with the corresponding features on the vehicle 10.

Accordingly, once the skeleton door assembly 30 is assembled to the vehicle, the vehicle will include the door bars 22 extending across the access opening 14 to provide some protection. Moreover, the open skeleton door assembly 30 provides an open environment preferred by some operators during off-road or other desired driving conditions. The structure of the skeleton door 30 can be of any shape or size that provides the desired protection as well as a desired aesthetic appearance.

Accordingly, the example convertible door 12 includes features that are removable and usable as a skeleton door without requiring an entirely different structure. Moreover, the module 22 is removed from the door 12 and assembled to hinges 56 and latches 26 that may be carried with the vehicle. Carrying all structures for assembly of the skeleton door assembly 30 within the vehicle enables conversion from the normal door 12 at any time and also reduces the need to store separate doors.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle door assembly comprising:
    a door housing configured for covering a vehicle access opening of a vehicle, the door housing including hinges for mounting the door housing to the vehicle;
    a frame member disposed within the door housing, the frame member having a channel; and
    a module including an intrusion beam and a tab, the tab received within the channel of the frame member to secure the module within the door housing, wherein the module is removable from the door housing;
    a module hinge for pivotally attaching the module to the vehicle once the module is removed from the door housing; and
    a module latch attachable to the module once the module is removed from the door housing, wherein the module, the module hinge and the module latch provide a secondary door assembly securable to the vehicle independent of the door housing.

2. The vehicle door assembly as recited in claim 1, wherein the module includes a first bracket on a first end of the intrusion beam and a second bracket on a second end of the intrusion beam.

3. The vehicle door assembly as recited in claim 2, wherein the door housing does not include an intrusion beam that is separate from the module.

4. The vehicle door assembly as recited in claim 3, wherein the intrusion beam comprises tubular structures.

5. The vehicle door assembly as recited in claim 3, wherein the second bracket is securable to the door housing with removable fasteners.

6. The vehicle door assembly as recited in claim 2, including a door glass assembly secured to the door housing independent of the module.

7. The vehicle door assembly as recited in claim 1, wherein the door housing is removable from the vehicle and the module hinge and the module latch are attachable to the vehicle to support the module relative to an access opening of the vehicle.

8. A method of assembling a door assembly comprising:
    assembling a module including vehicle door intrusion beams to a vehicle door housing by sliding a tab of the module into a channel of a frame member disposed inside the vehicle door housing such that the module is removable from the vehicle door housing, wherein the vehicle door housing includes hinges for mounting the vehicle door housing to a vehicle;
    configuring a module hinge assembly for attachment to the module;
    configuring a module latch assembly for attachment to the module;
    positioning a door glass assembly within the vehicle door housing by attaching the door glass assembly to the vehicle door housing independent of the module such that the vehicle door housing and the door glass assembly are removable from the module; and
    configuring the module so that the module is securable by the module hinge assembly to the vehicle proximate an access opening of the vehicle.

9. The method as recited in claim 8, including securing the module within the vehicle door housing with removable fasteners.

10. The method as recited in claim 9, wherein the module is slidable relative to the frame member.

11. The method as recited in claim 10, wherein the module includes a second bracket, the second bracket receives a portion of the removable fasteners such that the removable fasteners are accessible from an end of the vehicle door housing and the module is removable from the vehicle door housing by grasping the second bracket and sliding the module out from the vehicle door housing.

12. The method as recited in claim 11, wherein the module hinge assembly is securable to a first bracket of the module and the module latch assembly is securable to the second bracket.

* * * * *